March 10, 1931.   A. L. RAVEN   1,795,442
MOTION PICTURE SCREEN
Filed Jan. 30, 1928   3 Sheets-Sheet 1
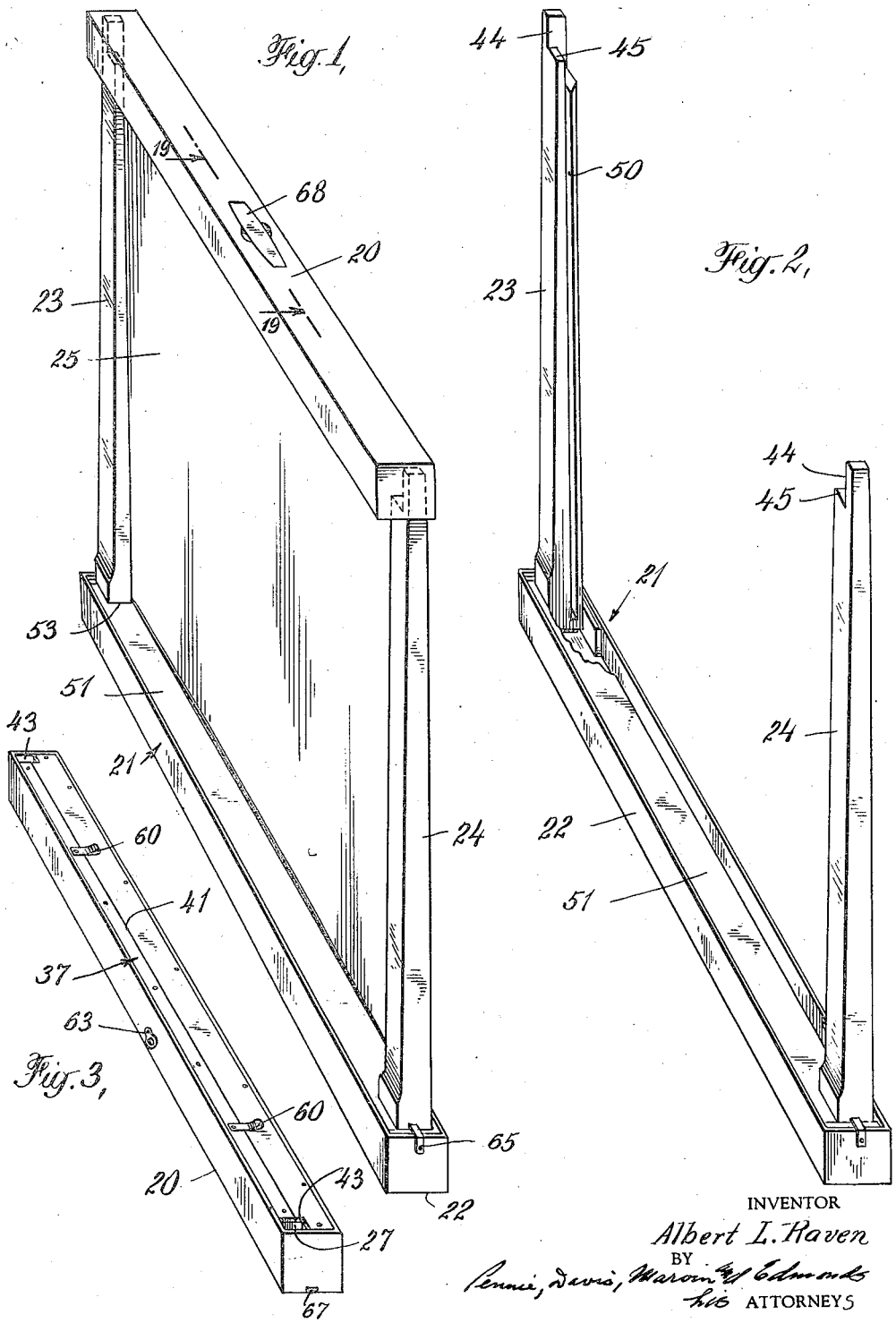
INVENTOR
Albert L. Raven
BY
Pennie, Davis, Marvin & Edmonds
his ATTORNEYS March 10, 1931.   A. L. RAVEN   1,795,442
MOTION PICTURE SCREEN
Filed Jan. 30, 1928   3 Sheets-Sheet 2
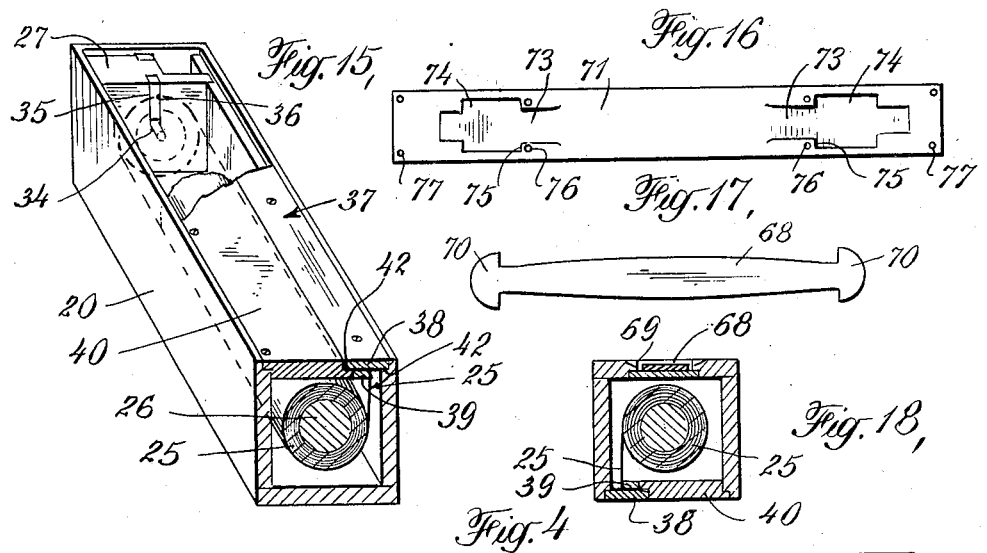
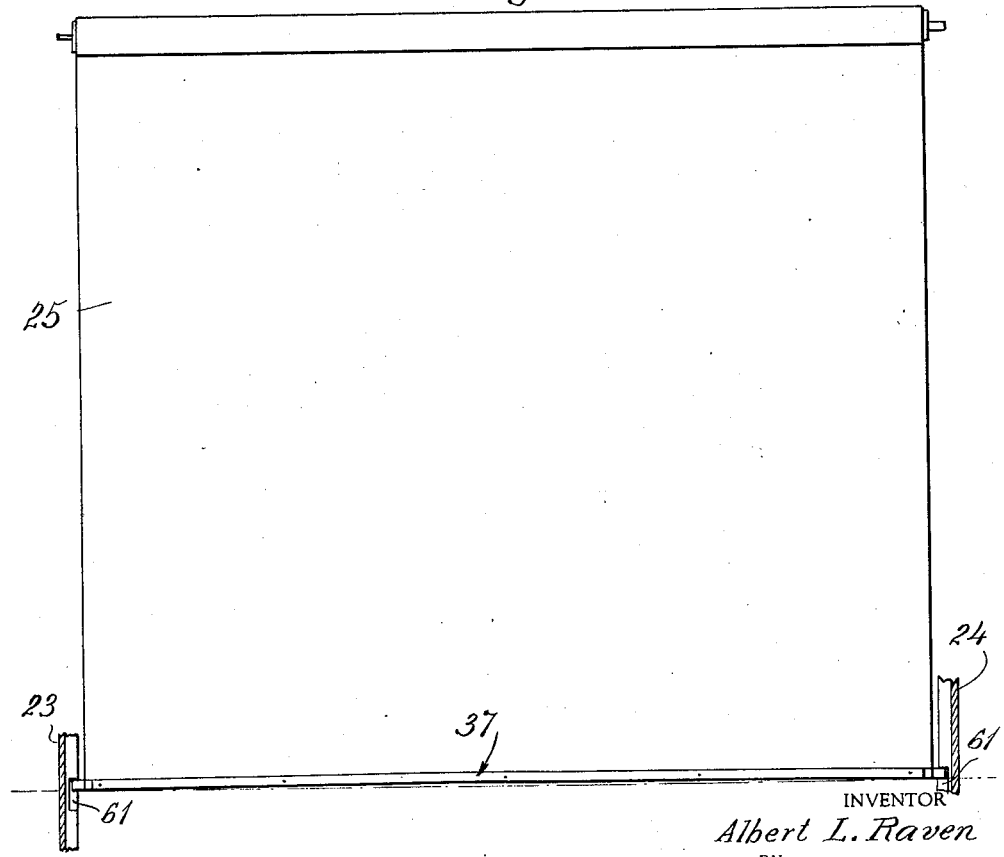
INVENTOR
Albert L. Raven
BY
his ATTORNEYS March 10, 1931. A. L. RAVEN 1,795,442
MOTION PICTURE SCREEN
Filed Jan. 30, 1928 3 Sheets-Sheet 3
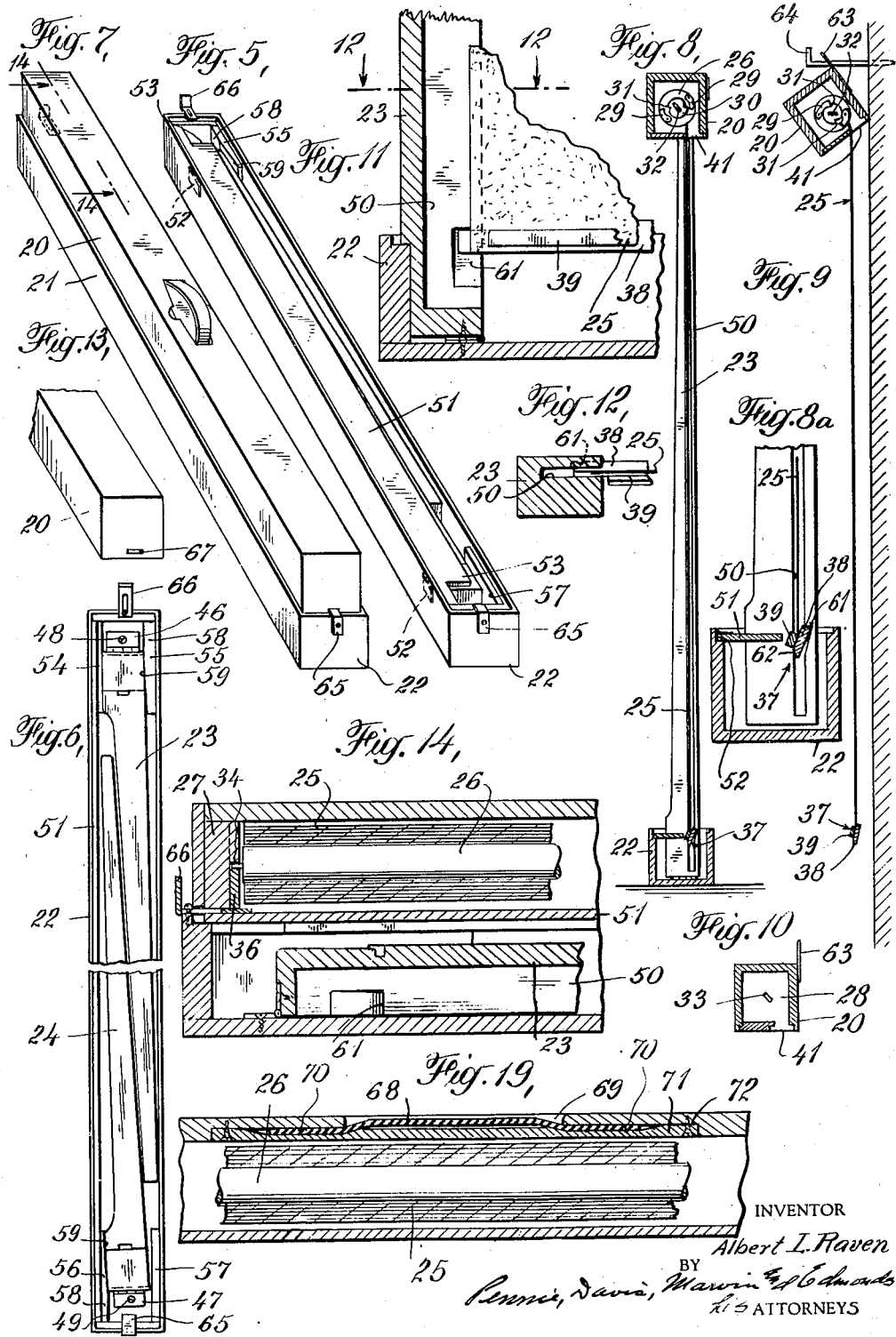

UNITED STATES PATENT OFFICE

ALBERT L. RAVEN, OF MOUNT VERNON, NEW YORK

MOTION-PICTURE SCREEN

Application filed January 30, 1928. Serial No. 250,426.

This invention relates to motion picture screens and more especially to an improved construction of support and housing for flexible sheet screens of moderate size intended to facilitate the exhibition of light projected pictures, particularly motion pictures, at home.

The principal object of my present invention is to provide a device for supporting a flexible sheet screen in smooth, flat condition during the exhibition of projected pictures thereon and adapted to fold into compact form for making the device readily portable, and for storage purposes.

Another object of the invention is to provide for taking up the stretch or fullness which inevitably occurs along the side edges of flexible sheet screens, without the use of mechanism that must be adjusted after the screen is placed in exhibiting position.

A further object of the invention is to provide a portable screen made in two separable sections, one serving as a housing or casing for the flexible sheet screen when rolled into cylindrical form, and the other adapted to serve as a support for this casing and constituting a frame for the screen, but the screen roll housing being capable of displaying the screen for exhibiting purposes without the use of the supporting and framing portion, if desired.

Another object of the invention is to provide a screen roll housing which completely encloses the roll and protects it from dust.

Another object of the invention is to so arrange the roll housing, and folding support or screen-framing device that the edges of the screen are concealed and protected, and that no recesses are visible in front of the screen either in the housing or the box-like base of the framing device during the exhibition of pictures on the screen, thus giving the screen as a whole a neat and dignified appearance.

A further object of the invention is to provide a construction in which light weight materials, such as wood or molded composition can be readily employed, so as to do away entirely with metal trimmings or reinforcing members and hence add to the neatness of the appearance of the screen.

A still further object of the invention is to provide a screen construction which is such that the screen can be easily set up for exhibition purposes, and easily taken down for storage or transportation.

The invention will be better understood by reference to the accompanying drawings showing by way of example one embodiment of my improved screen. In these drawings:

Fig. 1 is a perspective view showing the front and one end of the screen as a whole set up ready for the exhibition of pictures upon it;

Fig. 2 is a view similar to Fig. 1 with the flexible sheet screen withdrawn into its housing at the top and this housing removed;

Fig. 3 is a perspective view of the screen housing by itself with the screen withdrawn within the same and turned bottom side up to illustrate the protection which it affords to the sheet screen;

Fig. 4 is a diagrammatic front elevation of the flexible sheet screen illustrating the manner in which it is held in smooth flat condition when in exhibiting position as illustrated in Fig. 1;

Fig. 5 is a perspective view, and Fig. 6 a top view of the folding support structure of Fig. 2 with the side arms in folded position;

Fig. 7 is a perspective view of the screen housing of Fig. 3 secured upon the folded supporting structure of Fig. 5 ready for transportation or storage;

Fig. 8 is a section taken vertically of Fig. 1 near one end thereof showing the acurate alignment of the screen sheet and the roller stopping mechanism in inoperative position;

Fig. 8a is a detail showing notches for holding the screen down;

Fig. 9 is a sectional view illustrating the use of the screen housing of Fig. 3 without the folding support of Fig. 2, the housing being hung upon the wall and the roller stopping mechanism being in operative position;

Fig. 10 is a detail of the screen housing showing the mounting for the end of the roller illustrated in Figs. 8 and 9;

Fig. 11 is a fragmentary section taken at one of the lower corners of Fig. 1 and drawn to an enlarged scale;

Fig. 12 is a section taken on line 12—12 of Fig. 11;

Fig. 13 shows a detail at the end of the screen housing;

Fig. 14 is a longitudinal section taken on line 14—14 of Fig. 7 showing the lock for removably securing the screen housing upon the face of the supporting device;

Fig. 15 is a perspective view of a portion of the screen housing with the screen in the withdrawn position;

Figs. 16 to 19 inclusive are views illustrating the construction of the handle for the screen housing.

Referring now to these drawings, and first to Figs. 1 to 3 inclusive, my improved portable screen is built in two sections, namely a screen housing 20, and a folding support 21. The folding support 21 comprises a box-like base 22 having two tapering arms 23 and 24 hinged on the inside thereof at each end and provided with means for securing these arms in the upright position shown in Fig. 2 all of which will be more fully described hereafter. The screen housing 20 is arranged to be placed upon and supported by the tops of these arms 23 and 24 and contains a flexible sheet screen 25 mounted upon a roller 26 and adapted to be pulled down and held in stretched condition, as shown in Figs. 1 and 8.

The screen housing 20 is a substantially square box having bearing blocks 27 and 28 at its ends for the screen roller 26. Roller 26 is constructed like the ordinary shade roller and accordingly is provided with a spring mechanism which resists the unwinding of the screen 25, and with a stopping mechanism shown in Figs. 8 and 9 by which the roller may be held in a plurality of positions with the spring wound to various degrees and the screen 25 unrolled by corresponding proportions of its length. Accordingly, one end of the screen, namely that illustrated in Figs. 8 and 9 is provided with one or more dogs 29 loosely pivoted upon the end of the roller 26, and with a stationary member 30 having recesses 31 for the reception of the outer ends of dogs 29. The stationary member 30 is held against rotation by means of a flattened projection 32 which forms the support for the roller and is received in an elongated slot 33 in the bearing member 28. The opposite end of the roller 26 is supported by means of a pin 34 which is received within a slot 35 in the bearing block 27. The pin is held at the bottom of slot 35 by means of a filler block 36 which is secured in the slot.

The sheet screen 25 is secured along its inner edge to the roller 26 after the manner of securing window shades upon their rollers, and along the outer or exposed edge of the sheet screen there is a yielding stretching bar 37. This stretching bar consists of a strip of wood 38 secured to the back of the screen sheet by means of a batten 39 on the face of the screen. Batten 39 is about one-half of the width of the strip 38 so that strip 38 overlaps batten 39 on each side for a purpose which will appear later on.

The screen roller housing 20 is an elongated box made of strips of wood carefully fitted together at the lower corners (referring to Fig. 15) and partially closed at the top by a removable strip 40 which is secured in position by means of screws. Strip 40 is somewhat narrower than the housing so as to leave an elongated opening 41 for the screen along one side. The elongated opening 41 is closed by the stretching bar 37, and in order to provide a tight joint which will resist the entrance of dust, the exposed edge of strip 40, and the upper corner of the side of the box are rabbeted as indicated at 42.

When the screen is rolled up on roller 26 against the action of the spring within the roller, the tension of the spring tends to draw the stretching bar into the housing 20 and by turning the stretching bar slightly the tension of the screen will draw strip 38 of the stretching bar against the rabbeted joints 42. Inasmuch as the batten 39 is narrower than the strip 38 the pull exerted on strip 38 by the screen sheet is applied along a line intermediate the joints 42 and the screen thus tends to hold both edges of the stretching bar 37 firmly against the sides of elongated opening 41. Inasmuch as the stretching bar 37 fits accurately in the opening 41, and inasmuch as the ends of the stretching bar overlap the bearing blocks 27 and 28, the entrance of dust to the interior of the screen roll housing 20 is reduced to a minimum. The handle, which will be described below, is constructed in such manner as to avoid making an opening for the admission of dust.

At each end of the screen roll housing 20 there is a rectangular aperture 43, formed by cutting away the bearing blocks 27 and 28 respectively, and extending substantially throughout the depth of the housing, for the purpose of removably securing the screen roll housing upon the tops of the arms 23 and 24 of the folding support 22. For this purpose these arms are provided with rectangular projections 44 which are made to fit rather snugly in apertures 43 when the housing is placed in position. The relatively great length of projections 44 and apertures 43 and the snug fit therebetween insures that the housing 20 will be held square with respect to the arms 23 and 24 so as to make the appearance of the screen frame neat, and also to insure that the spring mechanism of the roller 26 operates free of the action of the stopping dogs 29, as will be described later. The weight of the screen roll housing is not supported on the tops of the projections 44, but is carried upon shoulders 45 at the bases of these projections.

The arms 23 and 24 are made substantially square at the base and relatively large so that they will have a good bearing surface within the box-like base 22 within which they are secured by means of the hinges 46 and 47. These hinges are each secured to the bottom of the base 22 by means of single screws 48 and 49 respectively. The hinges therefore form horizontal pivots, and the screws 48 and 49 vertical pivots for the arms 23 and 24 thereby providing a universal mounting for these arms whereby when the arms are swung upwardly from their folded position shown in Fig. 6 to the position shown in Figs. 1 and 2, the rear surfaces of the arms may be readily brought into the same vertical plane. In this way the slots 50 which extend longitudinally of the arms parallel with and adjacent to the backs of the arms for the guidance of the edges of the screen, are also brought into the same plane.

When the arms 23 and 24 are swung to the upstanding position the location of the hinges 46 and 47 is such as to bring the outsides of the bases of the arms against the end walls of the base 22. To maintain the arms in this position, there is provided a member 51 extending throughout the length of the base 22 and hinged adjacent the upper front corner thereof as indicated at 52 in Fig. 5. While the arms 23 and 24 are being moved to the upright position member 51 is swung upwardly out of the way, and then member 51 is swung down into the horizontal position again, and in doing this the shoulders 53 near the ends of member 51 are forced against the inside surfaces of the bases of the arms. This forces the outsides of the bases firmly against the end walls of the box-like base 22 which effectively secures the arms 23 and 24 against swinging movement about the hinges 46 and 47.

In order to prevent a forward and backward movement of the arms the construction of the interior of base 22 is such as to firmly hold the front and rear surfaces of the bases of the arms when the arms are in the upright position, and at the same time release this snug grip as the arms are lowered into the folded position shown in Fig. 6. In order to accomplish this the width of the bases of the arms is made substantially less than the width of the interior of the box-like base 22 (see Fig. 6). Two supporting and space-filling blocks 54 and 55 are fixed within the base 22 on the front and rear sides respectively of arm 23 and similar blocks 56 and 57 are provided for arm 24. Blocks 54 and 57, as viewed in Fig. 6, are plain rectangular blocks, while blocks 55 and 56 have each a rectangular portion 58 and a tapering portion 59. The tapering portions 59 allow the arms 23 and 24 to take the angular positions shown in Fig. 6 when folded, and as the arms are swung to the upright position the blocks 54—57 inclusive automatically turn the arms about the vertical pivots 48 and 49 respectively and square them up with the base 22 so that when they reach the upright position the arms are square, and both positioned in the same vertical plane.

Referring now to Figs. 1, 4, 8 and 8a, when it is desired to exhibit pictures on my improved motion picture screen, the arms 23 and 24 are moved to the upright position shown in Fig. 2, and the member 51 pressed down about its hinges so as to lock the arms in this position. Then the screen roll housing 20 is placed upon the projections 44. The tabs 60 (see Fig. 3) are grasped with the hands and the stretching bar 37 and sheet screen 25 are pulled downwardly. These tabs are so attached to the bar that the pull on them automatically turns the bar on edge so that the flat ends of the bar and the edges of the screen enter the flaring mouths of the slots 50. Continued downward pull carries the stretching bar 37 down to the top of the box-like base 22 where the opposite ends of the bar automatically slip into notches 61. The pull of the roller spring holds the screen 25 in stretched condition as shown in Figs. 1, 4 and 8. The edges of the screen project a substantial distance into slots 50 (Figs. 11 and 12) and the walls of these slots serve as supports for the edges of the screen and aid in keeping the screen smooth and flat and in protecting it from injury.

As shown in Fig. 4 diagrammatically the stretching bar 37 is held at two points only, namely at each end. The pull on the screen 25 exerted by the screen roller is uniform throughout the width of the screen. Hence if there is any fullness along the side edges of the screen so that the inner portion of the screen exerts a greater pull on the stretching bar 37 than the edges, this will be equalized by the arching or bowing of the stretching bar 37 until the fullness at the edges is removed, and the sheet is stretched smooth.

Referring to Fig. 8a it will be seen that there is no tendency for the ends of the stretching bar to be pulled loose from notches 61. This is because the screen 25 is attached to the strip 38 of the stretching bar at a point below the upper edge of the bar and consequently at some little distance laterally from the corner of notches 61. The pull of the screen being exerted at this point tends to cant or tilt the bar until the lower edges of strip 38 contact with the front walls of slot 50. The strip 38 is preferably flattened for a short distance at each end, as shown at 62, in order to permit a greater degree of tilting of the stretching bar. This brings the pull of the screen still further away from the corner of notches 61, and also moves the screen itself nearer the front wall of the slots 50, thus tending to close the space between the front edges of the screen and the front walls of the slot and make the appearance neater than if large spaces were left along each side edge of the screen. The elevation of notches 61 is such as to bring the top of the batten 39 along the front of the stretching bar 37 at approximately the same elevation as the upper surface of the member 51. This member 51 in addition to holding the arms 23 and 24 in upright position, closes the box-like base 22 in front of the screen and hides from view the interior of the base.

As will be seen in Figs. 8 and 10, the slot 33 for holding the projection 32 of the roller 26 is placed at an angle to the vertical side walls of the housing 20. When the housing 20 is held in the vertical position as it is when placed upon the arms 23 and 24, this angularity brings the recesses 31 of the stationary member 30 to positions where they cannot be engaged by the dogs 29. This position of the parts is shown in Fig. 8 and this figure is intended to show that when either dog is opposite either notch it will fall away from the same by gravity and not be caught in the notch. In other words, when the housing 20 is in position on the arms of the folding support 21, the roller stopping mechanism is rendered inoperative. This is a great convenience in pulling down the screen into exhibiting position because otherwise the stopping mechanism is very apt to catch at just about the same time that it is desired to hold the stretching bar 37 by the notches 61. Thus when the screen roll housing and folding support are used together to form a support and frame for the motion picture screen, the most useful and convenient operation is provided.

It is intended, however, that the screen roll housing 20 shall form a complete motion picture screen unit capable of use independently of the folding support 21. For this purpose one or more hangers or straps 63 are provided on the housing 20 by which the housing may be hung on the wall or other convenient support by means of any convenient hook 64, as shown in Fig. 9. The opening in hanger 63 is made large so that it will not fit snugly over the usual type of wire hook. The position of the hanger 63 on the housing 20 is such that the housing itself will tip with respect to the wall, as shown in Fig. 9, and this will bring one of the recesses 31 into position where the dogs 29 may fall into it on each half revolution of the roller 26. With the housing thus suspended the roller stopping mechanism is operative, and the roller operates as the ordinary shade roller so that an appropriate amount of the screen may be withdrawn from the roller and held in this position for the purpose of exhibiting pictures thereon. The screen will of course not be held in the substantially perfectly flat condition that it is held in when the folding support 21 is used because the edges of the screen will be unsupported, and the bowing action of the stretching bar 37 cannot be taken advantage of to remove the fullness from the side edges. The screen material which is preferably employed, however, is a relatively flexible sheet composed of fabric and rubber, as set forth in my prior Patent No. 1,315,743, granted September 9, 1919. This screen does not stretch or wrinkle badly and is of such weight and flexibility as to unroll and remain in fairly flat condition. Moreover, this screen material does not stretch badly at the edges.

The stretching bar 37 fits fairly closely on the elongated opening 41 so that when the picture screen is put away after use the bar is held in straight condition, thus preventing any tendency for it to become permanently bowed on account of the flexing of the bar in taking up the fullness at the edges of the screen.

The screen roll housing 20, and the folding base 21 may be secured together, as shown in Fig. 7 for storage and transportation purposes and for this reason the top of the box-like base 22 of the folding support is recessed slightly to receive the bottom of the housing 20, and fastening means such as the angular clip 65, and the slidable bar 66 are provided for holding the housing 20 in position in the recess. The clip 65 is fastened to the base 22 and is received within slot 67. A slidable bar 66 enters a similar slot in the opposite end of housing 20.

The handle construction shown in Figs. 16 to 19 inclusive comprises a leather handle member 68 which projects through a rectangular aperture 69 in the surface of the screen roll housing 20 so that it may be grasped by the hand. The handle is formed with heads 70 at each end and is held within recess 69 by a part 71 which is secured in a recess 72 on the interior surface of the wall of the housing surrounding aperture 69. Part 71 is preferably made of wood and its upper surface is chiseled out near each end to form channels 73 so that the ends of the strap may be received between the interior surface of recess 72, and the part 71. These chiseled-out portions 73 are enlarged, as shown at 74, to receive the head 70 of the handle, shoulders 75 being formed for the purpose of engaging the shoulders on the head 70. Part 71 is held in position in recess 72 by means of screws 76 and 77 and the chiseled-out portions 73 and 74 are sufficiently deep to allow the end portions of the flexible handle 68 to slide freely so that the handle normally takes the flat inconspicuous position shown in Figs. 1 and 19. When it is desired to use the handle to lift the apparatus, it is pulled out to the position shown in Fig. 7, where the shoulders of the head 70 engage the shoulders 75 on part 71 and firmly hold the handle against displacement.

The screws 76 are placed adjacent the shoulders 75 in order to reinforce them. The part 71 being larger than the aperture 69 and fitting closely within the walls of recess 72 forms a tight closure for the aperture 69 so that although the handle may be readily collapsed, or pulled out, if desired, nevertheless it is impossible for dust to get into the interior of the housing.

It will be observed from Figs. 1 and 8 that the face of the screen, that is, the side upon which the pictures are projected, is placed toward the roll 26, or, in other words, that the axis of the roll is in front of the surface of the screen. By arranging the screen in this manner the surface of the screen sheet is brought up close to the front edge of the elongated opening 41 when the screen is drawn all the way down. By closing up the space which is apt to exist here, a neater appearance is given to the frame of the screen. The closing up of this space is accomplished without marring the surface of the screen by drawing it over the edge of the opening 41. Thus as the screen is unrolled the diameter of the roll decreases, and this causes the surface of the screen to approach the edge of the opening. When the screen is nearly unwound, that is, when the bar 37 is about to be engaged in the notches 61, the diameter of the roll has been reduced in size sufficiently to bring the surface of the screen close to the edge of opening 41, and when the screen is rolled up the diameter immediately commences to increase so as to take the screen further from the edge of the opening.

Inasmuch as the screen roll is mounted at the top of the support instead of at the bottom, as in some portable screens, it is comparatively easy to unroll the screen even against the action of a fairly strong spring inasmuch as it is only necessary to pull down on the bar 37. This pulling movement tends to force the base 22 against the surface on which it rests instead of lifting it therefrom and requiring additional hands to hold it down.

What I claim as new and desire to secure by Letters Patent of the United States is:

1. A device of the character described comprising a box-like base having an arm slightly shorter than said base hinged near each end interiorly thereof to swing from within the base to a position perpendicular thereto, means for locking said arms in the perpendicular position, and a housing having a motion picture screen roll therein, said housing being placed upon the tops of said arms when they are in said perpendicular position, and removed therefrom when the arms are folded into said box-like base.

2. In a portable motion picture screen, the combination of a flexible sheet screen wound on a spring roller biased to resist the unwinding of the screen, a stretching bar of yielding material secured along the outer edge of the screen, means for rotatably supporting said roller, and means spaced therefrom for engaging each end of said yielding stretching bar to hold the screen in stretched condition against the action of the spring roller so as to permit the stretching bar to flex and take up the fullness along each side margin of the screen.

3. A device of the character described comprising an elongated base having arms extending upwardly near each end thereof to form side frames for a motion picture screen, and a housing mounted upon the tops of said arms, a flexible picture screen wound upon a spring roller within said housing, said housing having an elongated opening therein located behind the axis of the roller, and said screen being adapted to be unrolled and pass through said elongated opening in the housing and occupy the space between the arms for the purpose of projecting pictures thereupon, said screen being wound upon the roller with the face thereof toward the roller so that as the screen is unwound the face of the screen approaches the front edge of said elongated opening, and as the screen is rewound upon the roll the face recedes from said edge.

4. In a picture screen of the character described, the combination of a folding support comprising a box-like base having an arm hinged near each end thereof to swing from a folded position within the base to an upright position perpendicular to the base, and means for engaging all four sides of the base of each arm for holding the same in said upright position.

5. In a picture screen of the character described, the combination of a folding support comprising a box-like base having an arm hinged at each end thereof to swing from a folded position within the base to an upright position perpendicular to the base, and an elongated member extending lengthwise of said base and hinged to the upper part of the front thereof to swing upwardly to permit the arms to be raised from the interior of the base to said perpendicular position, and then to swing down between said arms and engage the inside surfaces thereof to force the arms outwardly and hold them in the upright position.

6. In a picture screen of the character described, the combination of a folding support comprising a box-like base, a pair of arms each tapering upwardly and pivoted for two-directional movement near the ends of the base, the tapered portions of said arms overlapping one another so as to permit the arms to fold into the same plane within said box-like base, and means on said base for engaging the sides of said arms to automatically turn them into a common vertical plane as they are swung from said folded position to the upright position perpendicular to the base.

7. In a picture screen of the character described comprising an elongated base having an arm at each end thereof extending upwardly to form the side frames of a motion picture screen, a screen roll housing independent of said base, a spring roller having a flexible sheet screen wound thereon within said housing, the spring in said roller being biased to resist the unwinding of the screen, said roller having a stopping mechanism which has an operative and an inoperative position, means for removably mounting said housing upon the tops of said supporting arms including means for holding said stopping mechanism in said inoperative position, and means at the bottom of said arms for holding the sheet screen in unrolled flat condition against the pull of the roller spring.

8. In a picture screen of the character described, a hollow screen roll housing having a flexible sheet screen therein wound upon a roller having a spring arranged to resist the unwinding of the screen, a stopping mechanism for preventing the winding up of the sheet screen after the same has been unwound from said roller a predetermined amount, said stopping mechanism being capable of occupying either an operative or an inoperative position according to the angular position of the housing, means on said housing for supporting the same in one angular position in which said stopping mechanism is inoperative, and a second means on said housing for supporting the same in a second angular position in which said stopping mechanism is operative.

9. A device of the character described comprising an elongated base having arms extending upwardly near each end thereof to form side frames for a motion picture screen, a housing for a screen roll mounted upon the tops of said arms, and a flexible sheet screen wound upon said roll, said screen being wider than the spacing of the inner faces of said arms, and said arms having each a slot in their inner faces, and the respective edges of said flexible screen extending a substantial distance into said slots when the screen is unwound from the screen roll and stretched in a flat sheet between said arms.

10. A device of the character described comprising an elongated base having arms extending upwardly near each end thereof to form side frames for a motion picture screen, and a flexible sheet screen supported between said arms, said screen being wider than the spacing of the inner faces of said arms, and said arms having each a slot in their inner faces, and the respective edges of said flexible screen extending a substantial distance into said slots.

11. A device of the character described comprising an elongated base having an arm extending upwardly near each end thereof to form side frames for a motion picture screen, a screen roll mounted upon the tops of said arms, a flexible sheet screen wound upon said roll, said roll having a spring biased to resist the unwinding of the screen, said arms each having a slot in their inner faces, a bar attached to the lower edge of said sheet screen, the ends thereof being adapted to slide in said slots, and means for holding the ends of said bar near the bottoms of said slots when the screen is unrolled comprising a notch in one wall of each slot adapted to receive the upper surface of said bar, and means for securing the lower margin of the screen to said bar between the upper and lower edges thereof so as to cause the pull of the screen to force the lower edge of the bar against the opposite walls of the slots and thereby hold the upper edge of the bar in said notches.

In testimony whereof I affix my signature.

ALBERT L. RAVEN